United States Patent
Tsai et al.

(10) Patent No.: US 6,193,843 B1
(45) Date of Patent: Feb. 27, 2001

(54) CATIONIC POLYSACCHARIDES AND REAGENTS FOR THEIR PREPARATION

(75) Inventors: John (Ji-Hsiung) Tsai, Belle Mead; Peter T. Trzasko; Michael T. Philbin, both of Plainsboro; Robert L. Billmers, Stockton; Martin M. Tessler, Edison, all of NJ (US); Joseph A. Van Gompel, Lodi, WI (US); Morton W. Rutenberg, No. Plainfield, NJ (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

(21) Appl. No.: 08/252,501

(22) Filed: Jun. 1, 1994

Related U.S. Application Data

(62) Division of application No. 08/004,161, filed on Jan. 11, 1993, now Pat. No. 5,349,089, which is a division of application No. 07/683,483, filed on Apr. 9, 1991, now Pat. No. 5,227,481, which is a continuation of application No. 07/516,024, filed on Apr. 27, 1990, now abandoned, which is a continuation-in-part of application No. 07/376,779, filed on Jul. 7, 1989, now abandoned.

(51) Int. Cl.$^7$ .................................................. D21H 17/24
(52) U.S. Cl. ......................... 162/175; 162/176; 162/177
(58) Field of Search .................................. 162/175, 176, 162/177

(56) References Cited

U.S. PATENT DOCUMENTS

| | | | |
|---|---|---|---|
| 2,813,093 | 11/1957 | Caldwell et al. | 260/233.3 |
| 2,876,217 | 3/1959 | Paschall | 260/233.3 |
| 2,935,436 | 5/1960 | Caldwell et al. | 162/175 |
| 3,067,088 | * 12/1962 | Hofreiter et al. | 162/175 |
| 3,208,999 | 9/1965 | Jarowenko et al. | 260/233.3 |
| 3,331,833 | * 7/1967 | Jarowenko | 260/175 |
| 3,354,034 | * 11/1967 | Jarowenko | 162/175 |
| 3,361,590 | 1/1968 | Gaertner | 111/135.5 |
| 3,459,632 | 8/1969 | Caldwell et al. | 162/175 |
| 3,666,751 | 5/1972 | Jarowenko et al. | 260/233.3 |
| 3,880,832 | 4/1975 | Tessler | 260/233.2 |
| 3,912,715 | 10/1975 | Jarowenko | 260/233.3 |
| 3,931,148 | 1/1976 | Langdon | 260/210 |
| 4,060,683 | 11/1977 | Tessler | 536/50 |
| 4,129,722 | 12/1978 | Iovine et al. | 536/43 |
| 4,205,064 | 5/1980 | Wagner et al. | 424/78 |
| 4,281,109 | 7/1981 | Jarowenko et al. | 536/50 |
| 4,330,365 | 5/1982 | Tessler | 162/168 |
| 4,452,978 | 6/1984 | Eastman | 536/111 |
| 4,719,272 | 1/1988 | Tsai et al. | 526/238.2 |
| 4,785,087 | 11/1988 | Stober et al. | 536/111 |
| 4,818,341 | 4/1989 | Degen et al. | 162/168.2 |
| 4,824,946 | 4/1989 | Schwengers et al. | 536/55.1 |
| 4,831,128 | 5/1989 | Tsai et al. | 536/111 |
| 4,992,536 | 2/1991 | Billmers et al. | 536/55.1 |
| 5,059,685 | 10/1991 | Conti | 536/1.1 |

FOREIGN PATENT DOCUMENTS

| | | | |
|---|---|---|---|
| 0 024 650 | 3/1981 | (EP) | C07O/265/30 |
| 0 281 134 | 9/1988 | (EP) . | |
| 2066663 | 7/1981 | (GB) | A61K/7/067 |
| 2063282 | 4/1983 | (GB) | C08B/31/12 |
| 2067610B | 6/1983 | (GB) . | |
| 61-113798 | * 6/1986 | (JP) | 162/175 |

OTHER PUBLICATIONS

Otey, F.H., Westhoff, R.P., and Mehltretter, C.L., *Ind. Eng. Chem. Prod. Res. Develop.*, vol. 11, No. 1, 1972, pp. 70–73.
Chemical Abstracts vol. 73, No. 14, Oct. 5, 1970, p. 71, Abstract No. 67858m.

\* cited by examiner

*Primary Examiner*—Peter Chin
(74) *Attorney, Agent, or Firm*—Laurelee A. Duncan; Karen G. Kaisler, Esq.; Eugene Zagarella

(57) ABSTRACT

Cationic polysaccharide derivatives are prepared by reacting a polysaccharide with a polycationic reagent having one polysaccharide reactive group and at least two cationic groups. Suitable reagents include polycationic alkyl, aryl, alkaryl, cycloaliphatic, or heterocyclic amines, some of which are novel compositions. The polycationic polysaccharide derivatives prepared from these reagents are useful in the manufacture of paper.

7 Claims, No Drawings

CATIONIC POLYSACCHARIDES AND REAGENTS FOR THEIR PREPARATION

This application is a division, of application Ser. No. 08/004,161, filed Jan. 11. 1993 now Pat. No. 5,349,089, which is a division of application Ser. No. 07/683,483, filed Apr. 9, 1991 now Pat. No. 5,227,481, which is a continuation of application Ser. No. 07/516,024, filed Apr. 27, 1990, abandoned which is a continuation-part of application Ser. No. 07/376,779, filed Jul. 7, 1989 abandoned.

BACKGROUND OF THE INVENTION

This invention relates to polycationic reagents, to novel cationic polysaccharide derivatives produced by reaction of polysaccharides with these reagents, and to the use of these polysaccharide derivatives in paper manufacturing. The polycationic reagents have at least two cationic groups and one polysaccharide-reactive group. Certain of these reagents are novel compositions of matter.

The modification of starch and other polysaccharides by chemical derivatization to produce various cationic polysaccharides is well known. Cationic polysaccharides, i.e., polysaccharides which have been modified so that they have a positive electrostatic charge, are used for a large number of applications and are particularly useful in the manufacture of paper due to their superior performance in the paper production as compared to unmodified polysaccharides. Amphoteric polysaccharides, i.e., polysaccharides which have been modified so they have cationic groups, together with a controlled amount of anionic (e.g., phosphate) groups, are used in a similar manner, with superior performance as compared to unmodified polysaccharides.

As used herein, the term "paper" includes sheet-like masses and molded products made from fibrous cellulosic material, which may be derived from natural sources as well as from synthetics such as polyamides, polyesters and polyacrylic resins, as well as from mineral fibers such as asbestos and glass. Also included are papers made from combinations of cellulosic and synthetic materials.

Various materials, including starch, are added to the pulp, or stock, during the paper-making process, prior to the formation of the sheet. One purpose of such additives is to bind the individual fibers to one another, thus aiding the formation of a stronger paper. Alum is employed in paper-making processes which are conducted under acidic conditions, however, alum-free, alkaline conditions in paper-making processes are becoming common in the industry.

In the case of those papers which contain added pigments, such as titanium dioxide, it has been known to add materials to the pulp, or stock, for the specific purpose of retaining a greater proportion of such pigments in the paper (rather than have them drain off in the water that is removed during the formation of the sheet). Such additives are often referred to as "pigment retention agents." Cationic starches have long been employed as additives in paper production for their contributions to drainage, strength and pigment and fine pulp retention in paper.

Starches used in paper manufacturing are typically used in dispersed form and starch inhibition is avoided. Starch inhibition refers to crosslinking modifications to the starch granule which limit or prevent granule hydration or swelling and disintegration during cooking (gelatinizing) to form a hydrated colloidal dispersion of starch molecules. Inhibited starches cannot form desirable dispersions and are not as effective in paper production as uninhibited starches. Other polysaccharides perform in a similar manner.

The polycationic reagents which have been used in the past to prepare polysaccharide derivatives contain more than one polysaccharide-reactive group or require reaction conditions which provide an opportunity for crosslinking of the polysaccharide. Thus, cationic polysaccharide derivatives prepared from these known reagents are only useful in paper production so long as the crosslinking, or inhibition, is controlled. Unlike the known reagents, the polycationic reagents of the present invention contain only one polysaccharide-reactive site (and therefore are not susceptible to undesirable crosslinking) and polysaccharide derivatives made therefrom are useful in paper production without any need for control of crosslinking of the polysaccharide derivative.

It has now been discovered that unexpected superior performance in paper production may be achieved by the use of novel cationic polysaccharide derivatives which are prepared by reaction of a polysaccharide with a reagent containing a single polysaccharide-reactive group and more than one cationic group. Where the cationic group is an amine, the performance of these derivatives far exceeds their expected performance based on degree of substitution or nitrogen content alone. These advantages are most advantageous in alum-free processes for making paper under alkaline conditions. It is believed that the high charge density per saccharide monomer unit which is produced by reaction with the reagents disclosed herein is responsible for the unexpected improvement in performance.

Accordingly, this invention provides a new class of cationic polysaccharide derivatives and polycationic reagents useful in the preparation of these polysaccharide derivatives. This invention also provides cationic polysaccharides for use in paper manufacturing showing improved drainage, pigment and pulp retention and paper strength as compared to cationic polysaccharides of the prior art.

SUMMARY OF THE INVENTION

The cationic polysaccharides of the present invention are polysaccharide derivatives which contain two or more cationic groups on the same substituent. The derivatives are prepared by reacting a suitable polysaccharide with a reagent containing a single polysaccharide-reactive group and two or more cationic groups. The reagent introduces a substituent group which provides a highly cationic polysaccharide at relatively low levels of substitution in comparison to the charge distribution of known cationic polysaccharides. Thus, where cationic polysaccharides of the prior art have substituents with a single cationic group, the cationic polysaccharides of the present invention have substituents with two or more cationic groups located on the derivatized saccharide monomer units.

The cationic polysaccharides of this invention are prepared by reaction of a polysaccharide with a reagent selected from a group of polycationic compositions having a single polysaccharide-reactive group. Thus, in contrast to cationic polysaccharides known in the art (e.g., graft copolymers of cationic monomers and polysaccharides), the polysaccharides herein are advantageously provided by a simple one-step reaction with a reagent. These reagents are polycationic alkyl, aryl, alkaryl, cycloaliphatic or heterocyclic amines, some of which are novel compositions of matter.

Cationic polysaccharides prepared from these reagents are more effective in paper manufacturing than polysaccharides of the prior art where the two polysaccharides have the same cationic group content (e.g., equal nitrogen content), particularly under alum-free, alkaline conditions. It follows that these polysaccharides are effective at a lower degree of substitution than the polysaccharides of the prior art.

DESCRIPTION OF THE PREFERRED EMBODIMENTS

The starches which may be used in preparing the cationic polysaccharide derivatives of the present invention may be derived from any plant source including corn, potato, sweet potato, wheat, rice, waxy rice, sago, tapioca, waxy maize, sorghum, high amylose corn, etc. Also included are derivatized starches such as starch ethers and esters; crosslinked starches; the conversion products derived from starches including, for example, dextrins prepared by the hydrolytic action of acid and/or heat; oxidized starches prepared by treatment with oxidants such as sodium hypochlorite; and fluidity or thin boiling starches prepared by enzyme conversion or by mild acid hydrolysis. In particular, starch derivatized to contain substituents carrying an anionic charge (e.g., phosphate containing starch) may be reacted with the polycationic reagents disclosed herein to yield amphoteric starch derivatives. These polycationic amphoteric starch derivatives are particularly useful in paper manufacturing.

The use of the term "starch" herein includes any amylaceous substance, whether untreated or chemically modified which, however, still retains free hydroxyl groups capable of entering into the reaction of this invention. If the desired product is to be a granular starch, the initial starting material must be in granular form. It is to be noted that the method of the invention may also be carried out employing gelatinized starches which will result in the production of non-granular starch derivatives.

The practitioner will recognize that the starch molecule is a polymer which contains many anhydroglucose units, each having three free hydroxyl groups (except the non-reducing end glucose units which contain four free hydroxyl groups and the 1,6-branched glucose units which contain two free hydroxyl groups) which may react with the reagent. Thus, the number of such displacements or the degree of substitution (D.S.) may vary with the particular starch, the ratio of the reagent to the starch and, to some extent, the reaction conditions. Furthermore, since it is known that the relative reactivity of each of the hydroxyl groups within the anhydroglucose unit is not equivalent, it is probable that some will be more reactive with the reagent than others.

Preparation of the starch derivatives of this invention preferably comprises reacting a polycationic reagent, as described below, with starch which is suspended or dispersed in water. The reaction of the reagent with the starch is preferably carried out at temperatures ranging from about 10° to 90° C. The lower temperatures (10–50° C.) are prefered for granular starch reactions.

The pH of the reaction mixture is ordinarily controlled so as to be above 7.0 but below 12.5, with the preferred range being dependent upon the reagent employed in the reaction. The preferred pH range is typically from 11.0 to 12.0. The pH is conveniently controlled by a periodic addition of a dilute aqueous solution of sodium hydroxide or other common base, including potassium hydroxide, sodium carbonate, calcium hydroxide, etc. Alternately, the pH is not controlled but an excess of the base is added initially to maintain alkaline pH throughout the reaction. Under certain conditions, it may also be desirable to add salts such as sodium sulfate or sodium chloride to suppress swelling of the starch and to provide a more easily filtered starch product. When hydrophobic reagents are employed, a phase transfer catalyst, such as tetramethylammonium hydroxide, also may be employed.

The amount of reagent used to react with the starch will vary from about 1 to 100%, preferably from 3 to 20%, based on the dry weight of the starch and dependent on such factors as the starch employed, the degree of substitution required in the end product and the particular reagent used.

Reaction time will typically vary from about 0.2 to 20 hours, preferably 1 to 6 hours, depending on such factors as the reactivity of the reagent, the amount of reagent, the temperature and pH employed. After completion of the reaction, the pH of the reaction mixture is preferably adjusted to 3.0 to 7.0 with any common acid such as hydrochloric, sulfuric, or acetic. The resultant modified starch, if in granular form, is then recovered by filtration, washed free of residual salts with water, and dried. Alternatively, the washed product may be drum dried, or spray dried, or jet-cooked and spray dried, or gelatinized and isolated by alcohol precipitation or freeze-drying. If the starch product is non-granular, it can be purified by dialysis, to remove residual salts and isolated by alcohol precipitation, freeze-drying, or spray-drying.

In an alternate embodiment, any of several dry processes for preparation of cationic starches may be employed herein. These dry processes are typically carried out in the presence of less than 30% water (on a starch dry weight basis), at alkaline pH, employing a beta-halo-amine or an etherifying halohydrin or epoxide polycationic reagent and granular starch in a substantially dry state. Dry reaction processes suitable for use herein include, but are not limited to, processes taught in U.S. Pat. No. 4,785,087, issued Nov. 15, 1988 to Stober, et al.; U.S. Pat. No. 4,281,109 issued Jul. 28, 1981 to Jarowenko, et al. and U.S. Pat. No. 4,452,978, issued Jun. 5, 1984 to Eastman; and U.K. Pat. No. 2,063, 282, issued Apr. 7, 1983 to Fleche, et al.

When the polysaccharide is a gum, the gums which may be used herein are polygalactomannans, which are heteropolysaccharides composed principally of long chains of 1,4-beta-D-mannopyranosyl units to which single unit side chains of alpha-D-galactopyranosyl units are joined by 1,6 linkages and hereafter referred to as "gums". Also included are degraded gum products resulting from the hydrolytic action of acid, heat, shear, and/or enzyme; oxidized gums; and derivatized gums. The preferred gums include gum arabic, as well as guar gum and locust bean gum because of their commercial availability.

The gum reactions with the polycationic reagents are carried out in a two-phase reaction system comprising an aqueous solution of a water-miscible solvent and the water-soluble reagent in contact with the solid gum. The water content may vary from 10 to 60% by weight depending upon the water-miscible solvent selected. If too much water is present in the reaction system, the gum may swell or enter into solution thereby complicating recovery and purification of the derivative. The water-miscible solvent is added in the amount sufficient for the preparation of a slurry which can be agitated and pumped. The weight ratio of water-miscible solvent to gum may vary from 1:1 to 10:1, preferably from 1.5:1 to 5:1. Suitable water-miscible solvents include alkanols, glycols, cyclic and acylic alkyl ethers, alkanones, dialkylformamide and mixtures thereof. Typical solvents include methanol, ethanol, isopropanol, secondary pentanol, ethylene glycol, acetone, methylethylketone, diethylketone, tetrahydrofuran, dioxane, and dimethylformamide. The reaction times and temperatures used for the aqueous reactions are suitable for the solvent reaction.

When the polysaccharide is cellulose, applicable celluloses useful herein include cellulose and cellulose derivatives, especially water-soluble cellulose ethers such as alkyl and hydroxyalkylcelluloses, specifically methylcellulose, hydroxypropylmethyl cellulose, hydroxybutylmethylcellulose, hydroxyethylmethylcellulose, and ethylhydroxyethylcellulose.

The cellulose reactions with the polycationic reagents are conveniently carried out using the procedure of U.S. Pat. No. 4,129,722 (issued Dec. 12, 1978 to C. P. Iovine, et al.). The cellulose or cellulose derivative is suspended in an organic solvent and a water solution of the derivatizing reagent is added thereto. Derivatization in the resultant two-phase mixture is ordinarily carried out with agitation at temperatures of 30° to 85° C., adding alkali if necessary to effect reaction. At least one of the initial phases (i.e., the suspended cellulose or cellulose derivative or the aqueous reagent solution) contains a suitable surfactant. It is important that the organic solvent used in the initial cellulose phase be immiscible with the aqueous derivatizing reagent phase, that it not dissolve the cellulose derivative as it is formed, that it have a boiling point at or above the temperature of the derivatizing reaction, that it be insensitive to alkali and not participate in the derivatization reaction.

The two phase procedure may also be used to prepare starch and gum derivatives as well as cellulose derivatives. It may also be used to prepare derivatives containing substituents derived from different reagents without isolating the substitution product from each reagent. This multiple substitution may be accomplished by the addition of several different reagents to the substrate-surfactant alkali mixture at the same time or sequentially.

After completion of the reaction, the solid cationic polysaccharides may be separated, if desired, from the reaction mixture by centrifugation or filtration. Preferably, the derivative is purified by washing with water in the case of the starch derivatives, with the aqueous solution of water-miscible solvent in the case of the gum derivatives or with the solvent in the case of the cellulose derivatives. Further washing with a more anhydrous form of the same solvent may be desirable for the gum derivatives. The derivatives are then dried using conventional methods, as in a vacuum, drum, flash, belt, or spray drier.

Reagents useful in preparing the polysaccharide derivatives of this invention include any polycationic reagent having at least two cationic groups and one polysaccharide-reactive group.

Suitable reagents which contain polysaccharide-reactive groups include, but are not limited to, any of the well known etherifying or esterifying reagents commonly used to produce nonionic, cationic or anionic sites on the polysaccharide. Suitable polysaccharide-reactive reagents include, but are not limited to, epoxide etherifying agents; halohydrins and other halogen substituted reagents; activated unsaturated compounds capable of reacting with the hydroxyl groups of the polysaccharide; organic anhydrides; beta- and gamma-halo amines; azetidines; benzyl halides; and alpha-halo esters, aldehydes, ketones, alkenes, acids and amides; alone or in combination with each other.

The polysaccharide-reactive group is typically a beta-chloroalkylamine, an epoxide, or a chlorohydrin group, such as are well known in the art. Any polysaccharide etherifying or esterifying reagent is suitable for use herein, provided that the polycationic reagent contains a single polysaccharide-reactive group so as to avoid crosslinking. Further, for paper manufacturing purposes, the polysaccharide must be water dispersible upon cooking and must not be excessively degraded as a result of reaction with the reagent. The practitioner will recognize that degradation which is excessive in one paper application may be appropriate in a different application and will select reagents and reaction conditions accordingly.

In addition to a polysaccharide-reactive group, the reagent must also contain at least two cationic groups. Preferred cationic groups are quaternary, tertiary and, in selected cases, secondary amines, or other nitrogen-containing, positive electrostatically charged groups. Also useful are sulfonium and phosphonium groups and any other cationic group which can be substituted onto starch without causing starch degradation or inhibition to a degree which interferes with starch derivative performance in paper production. Sulfonium and phosphonium derivatives of starch have been prepared. See, e.g., U.S. Pat. No. 2,989,520, issued Jun. 20, 1961 to Rutenberg, et al.; and U.S. Pat. No. 3,077,469, issued Feb. 12, 1963 to Aszalos, respectively.

Preferred reagents are selected from the group consisting of polycationic, polysaccharide-reactive, alkyl, aryl, alkaryl, cycloaliphatic or heterocyclic amines.

Suitable polycationic polysaccharide-reactive, alkyl, aryl, alkaryl, cycloaliphatic or heterocyclic amine reagents are those containing polyamine moieties, such as tertiary bis(dialkylamino-) alkyls, tertiary tris(dialkylamino-) alkyls, quaternary bis(trialkylamino-) alkyls, dialkylamino-trialkylaminoalkyls, and aryl and alkaryl isomers thereof, and limited (e.g., about 2 to 10 amine moieties) polymeric forms thereof.

Suitable polycationic, heterocyclic alkyl reagents include polysaccharide-reactive, polyamine, glycoside reagents, such as glucosides containing at least two tertiary or quaternary, di- or tri-alkyl, aryl or alkaryl amino-substituted alkyls, aryls or alkaryls; glucosides containing tertiary bis(di- alkyl, aryl or alkaryl amino-) substituted alkyls, aryls or alkaryls; or quaternary bis(tri- alkyl, aryl, or alkaryl amino-) substituted alkyls, aryls or alkaryls; or diamino-substituted alkyls, aryls or alkaryls containing a tertiary di- and a quaternary tri-, alkyl, aryl, or alkaryl aminoalkyl moiety; and polymeric (e.g., oligosaccharides of about 2 to 30 glucoside units) forms thereof. Also suitable for use herein are polysaccharide-reactive, polyamine glycosides (i.e., mono- or oligo-saccharides other than glucose).

Suitable polycationic polysaccharide-reactive, heterocyclic alkyl, aryl or alkaryl reagents include any reagents having a polysaccharide-reactive site and at least two cationic sites, at least one of which is present within a 5- or 6-member, nitrogen-containing, alkyl, aryl or alkaryl ring. The other cationic site(s) may be present in one or more additional 5- or 6-member, nitrogen-containing, alkyl, aryl or alkaryl ring(s); or in one or more alkyl, aryl or alkaryl tertiary or quaternary amine-substituted alkyl(s); or polymeric forms (e.g., about 3 to 10 alkyl-containing or 3 to 5 aryl-containing cationic monomers) thereof; or combinations thereof. Exemplifying this class are the single polysaccharide-reactive site dimers and oligomers of acetamidoalkylimidazoles disclosed herein.

Where polymeric forms of the reagent are used, the practitioner will appreciate that reaction efficiencies will dictate the upper limits of polymer size suitable for use herein. If polysaccharide derivatization is carried out in water, poor water solubility and the hydrolysis of particularly labile reagents will render certain embodiments (e.g., polymeric, aryl-containing, imidazole reagents) unsuitable.

If polysaccharide derivatization is carried out in an organic solvent, or with a substantially dry process, limitations on reagent selection will tend to arise from solubility or dispersibility of the reagent in the organic solvent, and from steric hinderance which may prevent the polysaccharide-reactive site of large reagents from readily coming into contact with polysaccharide hydroxyl groups.

Bis(Tertiary Dialkylamine) Reagent

A class of reagents preferred for use herein includes polycationic diamine compositions having the structure:

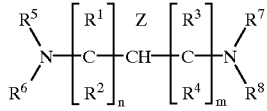

wherein

Z is a polysaccharide-reactive group;

$R^1$, $R^2$, $R^3$ and $R^4$ may be identical or different and represent hydrogen or a $C_1$–$C_6$ alkyl or a $C_6$ aryl or a $C_6$–$C_{12}$ alkaryl group;

$R^5$, $R^6$, $R^7$ and $R^8$ may be identical or different and represent a $C_1$–$C_6$ alkyl or a $C_6$ aryl or a $C_6$–$C_{12}$ alkaryl group, or may combine to form a $C_2$–$C_6$ alkylene or a $C_6$ arylene or a $C_6$–$C_{12}$ alkarylene group which may contain additional hetero atoms such as o or NR (R=$C_1$–$C_4$ alkyl); and n and m may be identical or different and represent integers from 1 to about 6, except that either n or m must be 1.

In a preferred embodiment, $R^1$, $R^2$, $R^3$ and $R^4$ are hydrogen and $R^5$, $R^6$, $R^7$ and $R^8$ are methyl or ethyl substituents. Alternatively, $R^5$ and $R^6$ and/or $R^7$ and $R^8$ form 5 or 6 member rings.

Suitable polysaccharide-reactive groups for use herein include halogens such as chloro, and bromo groups. As exemplified in Example 1, herein, a preferred reagent is 1,3-bis(dimethylamino)-2-chloropropane. This is a known composition and its preparation is reported in Slotta, K. H., and Behnisch, R., *Ber.* 68: 754–61 (1935). Also preferred for use herein are 1,3-bis(diethylamino)-2-chloropropane and 1,3-bis(dipropylamino)-2-chloropropane.

Any polysaccharide etherifying or esterifying group, such as are well known in the art, may be substituted for the polysaccharide-reactive halogen groups which are set forth above.

Glycoside Reagent

A class of polycationic, heterocyclic reagents preferred for use herein includes novel polycationic glycosides, comprising from one to about thirty monosaccharide unit(s), wherein glycoside reagents have a cationic substituent present at a degree of substitution of at least 0.5 and at least two cationic substituents.

In a preferred embodiment, the glycoside reagent comprises from one to about thirty glucose unit(s), and has the structure:

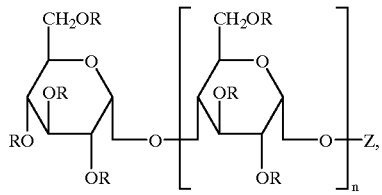

wherein Z is a polysaccharide-reactive group; n is an integer from 0 to about 30; and R may be, independently, selected from hydrogen, or anionic, cationic or neutrally charged substitutents, or alkyls, aryls or alkaryls, and anionic, cationic or neutrally charged substituted derivatives thereof, except that glycoside reagents must have a cationic substituent present at a degree of substitution of at least 0.5, and at least two cationic substituents.

In a preferred embodiment, R is, independently, selected from tertiary dialkylamino-substituted alkyls, quaternary trialkylamino-substituted alkyls, bis(tertiary dialkylamino-) substituted alkyls, bis(quaternary trialkylamino-) substituted alkyls, and polymers thereof, and hydrogen.

If the reagent comprises a single monosaccharide unit (n=O), that unit must contain at least two R groups which are cationic. (In other words, that unit must have a degree of substitution of at least 2.0. The degree of substitution (D.S.) is the average number of substituents per monosaccharide unit.) The reagent may contain from 1 to about 30 monosaccharide units. Thus, di- and trisaccharides, dextrins, oligosaccharides, and short chain amylose materials (i.e., 15–30 anhydroglucose units) are suitable starting materials for preparation of the reagent. The polysaccharide glycoside reagents must have a cationic D.S. of at least 0.5, and mono-, di-, and trisaccharides must have at least two cationic groups.

In a preferred embodiment, the method of Example 4 herein is used to prepare a polycationic polysaccharide-reactive glucoside having the structure:

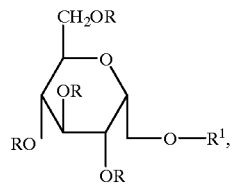

wherein at least 2 R groups are 3(N-trimethylammonium chloride)-2-hydroxy propyl groups; the remaining R groups may be, independently, hydrogen, or anionic, cationic or neutral groups, or alkyls, aryls or alkaryls which may be substituted with anionic, cationic or neutral groups; and $R^1$ is a 3-chloro-2-hydroxy propyl or a 2,3-epoxypropyl group. This glucoside is prepared by reacting glucose with allyl alcohol; reacting the allyl glucoside with 3(N-trimethylammonium chloride)-1-chloro-2-hydroxypropane; and reacting the polycationic allyl glucoside with HOCl to form a chlorohydrin intermediate which is converted to the polycationic epoxy glucoside.

The practitioner will recognize that other methods known in the art may be employed to prepare this reagent and other, novel polycationic glycosides that are useful reagents in this invention. Thus, reagents prepared by other methods fall within the scope of this invention. In addition, glycosides (i.e., monosaccharides, other than glucose, such as galactose or mannose) may be substituted for the glucosides described herein. Additionally, the practitioner will recognize that isomeric forms of the structures set forth above will exist when a glycoside comprises saccharides other than glucose.

Tertiary-Quaternary Diamine Reagent

Polyamine reagents containing tertiary or quaternary-tertiary amines which are preferred for use herein include polyamine compositions having the structure:

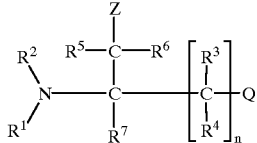

wherein $R^1$ and $R^2$ may be identical or different and represent a $C_1$–$C_6$ alkyl group or a $C_6$ aryl or a $C_6$–$C_{12}$ alkaryl group, or may combine to form a $C_2$–$C_6$ alkylene or a $C_6$ arylene or a $C_6$–$C_{12}$ alkarylene group which may contain additional hetero atoms such as O or NR (R=$C_1$–$C_4$ alkyl); $R^3$, $R^4$, $R^5$, $R^6$ and $R^7$ may be identical or different and represent hydrogen or a $C_1$–$C_6$ alkyl group or a $C_6$ aryl or a $C_6$–$C_{12}$ alkaryl group, or a tertiary amino- or a quaternary amino- alkyl, aryl or alkaryl group containing $C_1$–$C_6$ alkyl, or $C_6$ aryl, or $C_6$–$C_{12}$ alkaryl substituents; n is an integer from 0 to about 6; Z is a polysaccharide-reactive group; Q may be hydrogen or:

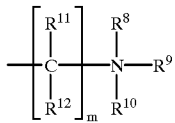

wherein $R^{11}$ and $R^{12}$ may be identical or different and represent hydrogen or a $C_1$–$C_6$ alkyl group or a $C_6$ aryl group or a $C_6$–$C_{12}$ alkaryl group; m is an integer from 0 to about 6; and $R^8$, $R^9$ and $R^{10}$ may be identical or different and represent a $C_1$–$C_6$ alkyl group or a $C_6$ aryl group or a $C_6$–$C_{12}$ alkaryl group, or may combine to form a $C_2$–$C_6$ alkylene or a $C_6$ arylene or a $C_6$–$C_{12}$ alkarylene group which may contain additional hetero atoms such as O or NR (R=$C_1$–$C_4$ alkyl), or either $R^8$, $R^9$ or $R^{10}$ may be hydrogen provided that only one is hydrogen; except that when Q is hydrogen, either $R^5$, $R^6$ or $R^7$ (or $R^3$ or $R^4$, if n is not equal to zero), must be a tertiary amino- or a quaternary amino-alkyl or aryl or alkaryl group, containing $C_1$–$C_6$ alkyl, or $C_6$ aryl or $C_6$–$C_{12}$ alkaryl substituents.

In a second preferred embodiment, polyamine reagents useful herein include diamino reagents having the structure:

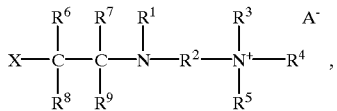

wherein $R^1$, $R^3$, $R^4$ and $R^5$ may be identical or different and represent a $C_1$–$C_6$ alkyl group or a $C_6$ aryl group or a $C_6$–$C_{12}$ alkaryl group; $R^2$ may be a $C_2$–$C_6$ alkylene or alkylene ether or a $C_6$ arylene or a $C_6$–$C_{12}$ alkarylene group; $R^6$, $R^7$, $R^8$ and $R^9$ may be, independently, hydrogen or a $C_1$–$C_6$ or a $C_6$ aryl or a $C_6$–$C_{12}$ alkaryl group; X is a halogen ; and A is an anion. Other polysaccharide-reactive groups may be employed in place of the halogen.

Exemplifying a reagent of this class is a novel composition of matter, 3-[(2-chloroethyl)ethylamino]-N,N,N-trimethyl-1-propanaminium iodide, having the structure:

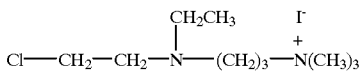

This composition may be prepared by the method set forth in Example 2, or by any other suitable method.

Polycationic polyamine reagents preferred for use herein include reagents having the structure:

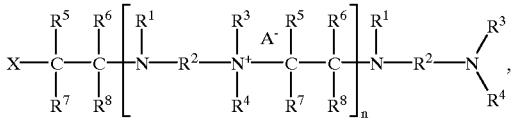

wherein $R^1$, $R^3$ and $R^4$ may be identical or different and represent a $C_1$–$C_6$-alkyl group or a $C_6$ aryl group or a $C_6$–$C_{12}$ alkaryl group; $R^2$ may be a $C_2$–$C_6$ alkylene or alkylene ether or a $C_6$ arylene or a $C_6$–$C_{12}$ alkarylene group; $R^5$, $R^6$, $R^7$ and $R^8$ may be, independently, hydrogen or a $C_1$–$C_6$ alkyl or a $C_6$ aryl or a $C_6$–$C_{12}$ alkaryl group; n represents an integer from 1 to about 10; X is a halogen; and $A^-$ is an anion. Other polysaccharide-reactive groups may be employed in place of the halogen.

Heterocyclic amine reagents preferred for use herein include a series of 4-substituted piperazines having the structure:

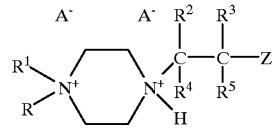

wherein A is an anion; Z is a polysaccharide-reactive group; R, $R^1$, $R^2$, $R^3$, $R^4$ and $R^5$ may be, independently, hydrogen or a $C_1$–$C_6$ group or a $C_6$ aryl group or a $C_6$–$C_{12}$ alkaryl group, or a tertiary amino- or a quaternary amino- alkyl, aryl or alkaryl group, containing $C_1$–$C_6$ alkyl, or $C_6$ aryl or $C_6$–$C_{12}$ alkaryl substituents.

In a preferred embodiment, the polysaccharide-reactive group is a halogen group (i.e., the reagent is a 4-substituted 1-(2-haloethyl) piperazine). Suitable halogen groups include chloro and bromo groups. Preferred R and $R_1$ groups include, respectively, two hydrogens (the reagent contains a secondary and a tertiary amine); methyl and hydrogen (the reagent contains two tertiary amines); two methyls (the reagent contains a quaternary and a tertiary amine); two ethyls (the reagent contains a quaternary and a tertiary amine); or hydrogen and diethylaminoethyl (the reagent contains three tertiary amines).

Exemplifying these preferred embodiments are 1-(2-chloroethyl) piperazine dihydrochloride; 4-methyl-1-(2-chloroethyl) piperazine dihydrochloride; 4,4-dimethyl-1-(2-chloroethyl) piperazinium chloride hydrochloride; 4,4-diethyl-1-(2-chloroethyl) piperazinium chloride hydrochloride, and 4-(2-diethylaminoethyl)-1-(2-chloroethyl) piperazine trihydrochloride.

In a preferred embodiment, the reagent employed is a secondary amine-containing polycationic, piperazine reagent, 1-(2-chloroethyl) piperazine dihydrochloride, having the structure:

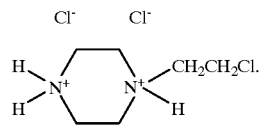

This reagent may be prepared by the method of Example 5, or by any method known in the art.

In addition to the embodiments described above, other polycationic, polysaccharide-reactive, heterocyclic, alkyl reagents may be employed to prepare the polysaccharide derivatives herein, provided that they contain a single polysaccharide-reactive site. For paper-making purposes, the resultant starch derivative must also be water dispersible upon cooking and not excessively degraded as a result of reaction with the reagent.

The practitioner will recognize that the polysaccharide-reactive site may include any polysaccharide etherifying or esterifying group, as well as the chloroethylamino groups exemplified above and in Example 2. Additionally, any selection of multiple amino groups may be employed to provide a tertiary-quaternary diamino-substituted alkyl reagent preferred for use herein, provided that the reagent's configuration, reactivity and solubility permit reaction of the polysaccharide-reactive site with the polysaccharide.

Imidazole Oligomer Reagent

Polycationic, polysaccharide-reactive, heterocyclic, aryl or alkaryl reagents preferred for use herein include imidazoles having the structure:

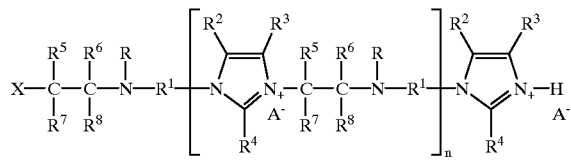

wherein X is a halogen; R may be a $C_1$–$C_6$ alkyl or a $C_6$ aryl, or a $C_6$–$C_{12}$ alkaryl group; $R^1$ may be a $C_2$–$C_6$ alkylene or alkylene ether or a $C_6$ arylene or a $C_6$–$C_{12}$ alkarylene group; $R^2$, $R^3$ and $R^4$ may be, independently, hydrogen, or $C_1$–$C_6$ alkyl or a $C_6$ aryl or a $C_6$–$C_{12}$ alkaryl group; $R^5$, $R^6$, $R^7$ and $R^8$ may be, independently, hydrogen or a $C_1$–$C_6$ alkyl or a $C_6$ aryl or a $C_6$–$C_{12}$ alkaryl group; n is an integer from 0 to about 10; and $A^-$ is an anion.

Due to the charge distribution within the imidazole ring, the imidazole oligomer reagent must contain at least two imidazole rings (or one imidazole ring and a second cationic group) to provide a polycationic reagent. The polysaccharide-reactive group may be any tertiary (but not quaternary) beta-haloamine as illustrated above. In the alternative, the polysaccharide-reactive group may be an chloroacetamido group as illustrated below. A halo-alkyl-quarternary amino group will not react with polysaccharides under preferred aqueous reaction conditions.

A preferred polycationic reagent disclosed herein is an oligomer of an imidazole monomer, N-[chloroacetamido] alkyimidazole, having the structure:

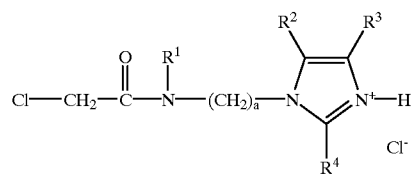

wherein $R^1$, $R^2$, $R^3$ and $R^4$, independently, may be hydrogen, or a $C_1$–$C_6$ alkyl or a $C_6$ aryl or a $C_6$–$C_{12}$ alkaryl group; and a is an integer from 1 to about 6.

The preparation of chloroacetamide-containing imidazoles is taught in U.S. Pat. No. 3,880,832, issued Apr. 29, 1975, to Tessler.

Novel oligomeric forms of this chloroacetamidoalkyl imidazole monomer are disclosed herein. These novel polymeric forms ("imidazole oligomerso") have the basic structure:

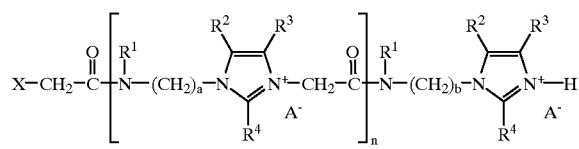

wherein $R^1$, $R^2$, $R^3$ and $R^4$, independently, may be hydrogen, or a $C_1$–$C_6$ alkyl or a $C_6$ aryl or a $C_6$–$C_{12}$ alkaryl group; a and b are, independently, integers from 1 to about 6; n is an integer from 1 to about 10; X is a halogen; and $A^-$ is an anion. Quaternary amine functionalities in these imidazole oligomers are created by this polymerization.

Imidazole oligomers containing from two to four imidazole rings are most preferred for use in preparing the polycationic polysaccharide derivatives herein. These reagents provide excellent polycationic charge density. Larger imidazole oligomers (e.g., 5 to about 30 imidazole rings) are suitable for use herein provided that steric hinderance, insolubility, or other factors which detract from polysaccharide reactivity are adequately controlled.

These novel imidazole oligomer compositions may be prepared by the method of Example 3, herein.

The practitioner will recognize that any polysaccharide esterifying or etherifying functionality may be substituted for the halogen—acetamido or beta-halogen tertiary amino polysaccharide-reactive sites exemplified herein, provided that the reagent remains polysaccharide-reactive and polycationic.

Quaternary-Quaternary Diamine Reagent

Polyamines containing at least two quaternary amines which are preferred for use herein include polyamines having the structure:

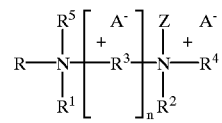

wherein R, $R^1$, $R^2$ $R^4$ and $R^5$ may be identical or different and represent a $C_1$–$C_6$ alkyl group or a $C_6$ aryl or a $C_6$–$C_{12}$ alkaryl group, or may combine to form a $C_2$–$C_6$ alkylene or $C_6$ arylene or $C_6$–$C_{12}$ alkarylene group and may contain additional hetero atoms such as O or $NR^6$ ($R^6$=$C_1$–$C_4$ alkyl), except that $R^2$ and $R^4$ cannot be 2-(trialkylammonio halide) ethylene groups; Rmay be a $C_2$–$C_6$ alkylene or alkylene ether or a $C_6$ arylene or a $C_6$–$C_{12}$ alkarylene group; A is an anion; Z is a polysaccharide-reactive group; and n is an integer from 1 to about 10.

Exemplifying a reagent of this class is a novel composition of matter, 1-glycidyl-1,4,4-trimethyl-piperazinium dichloride, having the structure:

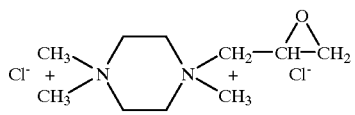

This reagent may be prepared by the method set forth in Example 8, or by any other suitable method.

Exemplifying a second reagent of this class is a novel composition of matter, 3-bromo-2-hydroxypropyl 2-(trimethylammonio chloride) ethyl dimethylammonium phthalate, having the structure:

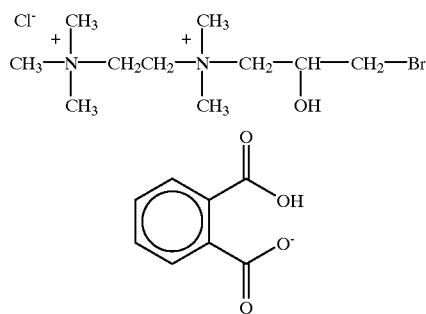

This reagent may be prepared by the method of Example 8, or by any other suitable method.

As with other reagents herein, in the quaternary-quaternary diamine reagent, the polysaccharide reactive group may be any halohydrin, epoxide, haloacetamido alkyl, 2-dialkylaminoethyl halide, or any other polysaccharide reactive group, and any anion (e.g., the phthalate) may be substituted for the chloride exemplified herein. For the halohydrin-substituted reagent, the anion is preferably derived from the oxidizing reagent (e.g., magnesium monoperoxyphthalate) used to oxidize the unsaturated diamine to form the halohydrin diamine.

In the examples which follow, all parts and percentages are given by weight and all temperatures are in degrees Celsius unless otherwise noted. Reagent percentages are based on dry polysaccharide. The nitrogen content of the starch derivatives was measured by the Kjeldahl method and is based on dry polysaccharide.

The following test procedures were used in the examples which follow to characterize the utility of the starch and other polysaccharide derivatives in the manufacture of paper.

Britt Jar Drainage Performance Test

Drainage performance of the starch derivatives was tested employing a Britt Jar which was modified by the addition of an extended mixing cylinder and an agitator set at 250 rpm. Unbleached softwood Kraft was beaten to a 500 ml CSF (Canadian Standard Freeness) and diluted to 0.5% consistency. The pH was adjusted to 8.0.

An amount of starch (1.0% of pulp on a dry weight basis) to be evaluated for drainage performance was cooked for about 20 minutes and added, with agitation, to a 345 ml aliquot of the pulp suspension. The suspension was then added to 1,500 ml of water in the Britt Jar and the agitator was turned on. A stopper was removed from the base of the jar and the time in seconds required for 1,200 ml of water to drain through a 200 mesh wire screen was noted. The drainage rate was calculated as ml/second. Drainage efficiency or performance was calculated as a percentage of the control.

The control for the drainage test in an alkaline system (e.g., pH=8.0) consisted of a cationic starch ether derivative of the prior art, i.e., a diethylaminoethyl ether of waxy maize containing 0.27% nitrogen by weight (dry basis). The control for an acid system consisted of an amphoteric starch ether derivative of the prior art, i.e., a phosphorylated diethylaminoethyl ether of waxy maize containing 0.27% nitrogen and 0.1% phosphorus by weight (dry basis). Both starch derivatives were prepared as described in U.S. Pat. No. 3,459,632 issued on Aug. 5, 1969 to Caldwell, et al.

Dynamic Alkaline Retention Evaluation

A bleached, 80/20 hardwood/softwood, kraft pulp containing, on a dry weight basis, 30% ground $CaCO_3$ filler and 70% fiber, was beaten to 400 CSF, diluted to 0.5% consistency, and the pH was adjusted to 7.5–8.0 with dilute NaOH/HCl.

A 500 ml aliquot of this pulp was added to a Britt Jar having a stopper and an agitator blade set at ⅛-inch above a 200 mesh screen at the bottom of the jar. The pulp was agitated in the jar at 400 rpms, and 5 ml of a starch dispersion (samples vary from 0 to 5% solids) were added to the pulp. The agitation was immediately increased to 1000 rpms and, after 30 seconds, the stopper was pulled and, after 5 seconds, drop water was collected for 10 seconds.

Employing an ethylene diamine tetraacetic acid (EDTA) titration method (Standard Methods of Chemical Analysis, N. H. Furman, Ed., 6th Ed., Vol. 1, D. VanNostrod Co., Inc., 1962, p. 202), the drop water samples, a raw water blank, and an alkaline pulp control were tested for hardness, expressed as unretained $CaCO_3$. The % $CaCO_3$ retention was calculated using this formula:

% $CaCO_3$=100×(Control Pulp ml EDTA-blank)−(Sample ml EDTA-blank) (Control Pulp ml EDTA-blank)

Paper Dry Strength Test

In the paper tests, the tensile strengths are reported as breaking length (meters). The breaking length is the calculated limiting length of a strip of uniform width, beyond which, if such a strip were suspended by one end, it would break of its own weight. The breaking length (air dry) in meters (m) is calculated as B.L.=102,000 T/R or B.L.=3,658 T'/R', where T is tensile strength in kN/m, T' is tensile strength in lb/in, R is grammage (air dry, in g/m$^2$) and R' is weight per unit area (air dry, in lb/1000 ft $^2$).

Paper specimens were selected in accordance with TAPPI T 400 sampling procedure. Those evaluated for wet strength and temporary wet strength were saturated with distilled water by immersion and/or soaking until the paper sample was thoroughly wetted. The strength was evaluated in accordance with TAPPI T 494 om-81. The measurements were carried out using a constant rate of elongation apparatus, i.e., a Finch wet strength device, which is described in TAPPI Procedure T 456 om-81 (1982). The dry strength was evaluated in accordance with TAPPI T 494 om-81.

Scott Bond Test

In this test, the force required to delaminate paper (Z-directional failure) is measured on an Internal Bond Tester (Model B, obtained from GCA/Precision Scientific, Chicago, Ill.) apparatus and expressed as Scott Bond Units on a low scale (0–250 Units) or a high scale (251–500 Units). In tests conducted on the high scale, weights are installed on the apparatus, whereas in low scale tests, no weights are used.

To measure Scott Bond Units, pre-cut paper specimens are sandwiched between two identically sized segments of double-faced pressure sensitive adhesive tape (Tape #406, obtained from GCA/Precision Scientific, Chicago, Ill.). The paper-tape sandwich is mounted on the apparatus, Z-directional force is applied until the paper breaks, and the amount of force required to reach this breaking point is read off a scale as Scott Bond Units.

Mullen Test

The Mullen Test of paper dry strength is reported as TAPPI Procedure T 403 om-85, a standard test used in the paper industry. The test measures the force required for a rubber diaphram to burst through a rigidly suspended paper specimen. The bursting strength is measured on a Mullen tester apparatus (obtained from B. F. Perkins, Chicopee, Mass.) and is defined as the hydrostatic pressure in kilopascals per square meter (or in the lb/in$^2$ (PSI) equivalent) required to rupture the paper when pressure is increased at a controlled constant rate through the rubber diaphram. Paper strength may be measured at the low (0–60) or high (0–200) range of the Mullen apparatus. Results may be expressed as the Mullen Factor or the Average Mullen Value, in PSI units divided by the paper sheet's basis weight in lbs/ream (i.e., lbs per 3,300 ft$^2$ of paper or per 500 (25"×38") sheets).

EXAMPLE 1

This example illustrates the preparation of a cationic starch derivative employing a 1,3-bis(dialkylamino)-2-chloropropane, and the utility of this starch derivative in paper making.

A. Preparation of 1,3-bis(dimethylamino)-2-chloropropane Reagent

The starting alcohol, 1,3-bis(dimethylamino)-2-propanol (obtained from Aldrich Chemical Company), was purified by vacuum distillation at 18 mm Hg and 80° C. The purified alcohol was chlorinated by reaction with thionyl chloride, as described in Slotta, K. H., and Behnisch, R., *Ber.* 68:754–61 (1935), to form the reagent.

B. Preparation of the Tertiary Diamine Starch Derivative

A total of 100 g of starch was added to a solution of 125 ml of water and 40 g of sodium sulfate at 42° C. The pH was raised to 11.5 by the addition of a solution containing 5% sodium hydroxide and 10% sodium sulfate. The 1,3-bis (dimethylamino)-2-chloropropane dihydrochloride reagent (3.5 g, or the appropriate amount for the desired treatment level) was added, with agitation, and the pH was maintained at 11.5 to 11.7. The reaction was continued for 16 hours, the reaction mixture was neutralized to pH 4.5 with 3:1 hydrochloric acid and filtered, and the starch was washed three times, and air dried.

C. Drainage Performance of Tertiary Diamine Starch Derivatives

The starch derivatives described in Table I were prepared by the methods of Parts A and B, above, and tested for pulp drainage performance at pH 8.0 by the Britt Jar method as set forth herein. Results are shown in Table I. These results demonstrate that compared to commercially used cationic starches, superior, alum-free drainage can be obtained with tertiary diamine starch derivatives at all addition levels tested and at all nitrogen contents tested. The diamine starch derivatives yield drainage rates that are from 170 to 242% faster than the rates for the commercially used controls (mono-tertiary and quaternary amine starch derivatives, and polyethyleneimines).

TABLE I

Drainage Performance

| Sample | % Nitrogen (dry starch) | Drainage % of Standard | % Addition Level |
|---|---|---|---|
| Blank | — | 71.9 | — |
| Monoamine Starch Control[a] | 0.27 | 100.0 | 0.4 |
| Diamine Starch[b] | 0.28 | 176.8 | 0.4 |
| Diamine Starch[b] | 0.32 | 185.4 | 0.4 |
| Diamine Starch[b] | 0.30 | 170.0 | 0.4 |
| Polyethyleneimine (CORCAT P600)[e] | — | 60.3 | 0.05 |
| Amphoteric Monoamine Starch[f] | 0.30 | 96.6 | 0.40 |
| Blank | — | 66.3 | — |
| Monoamine Starch Control[a] | 0.27 | 100.0 | 1.0 |
| Diamine Starch[b] | 0.28 | 231.8 | 1.0 |
| Diamine Starch[b] | 0.32 | 242.0 | 1.0 |
| Diamine Starch[b] | 0.30 | 221.7 | 1.0 |
| Polyethyleneimine (CORCAT P600)[e] | — | 77.4 | 0.10 |
| Amphoteric Monoamine Starch | 0.30 | 139.5 | 1.00 |
| Quaternary Amine Waxy Maize Starch | 0.28 | 116.1 | 1.00 |
| Monoamine Potato Starch (PROBOND)[d] | — | 103.9 | 1.00 |
| Blank | — | 70.8 | — |
| Monoamine Starch Control[a] | 0.27 | 100.0 | 0.4 |
| Diamine Starch[b] | 0.15 | 124.8 | 0.4 |
| Diamine Starch[b] | 0.19 | 144.0 | 0.4 |
| Diamine Starch[b] | 0.20 | 125.5 | 0.4 |
| Diamine Potato Starch[c] | 0.20 | 125.5 | 0.4 |
| Blank | — | 61.7 | — |
| Monoamine Starch Control[a] | 0.27 | 100.0 | 1.0 |
| Diamine Starch[b] | 0.15 | 151.2 | 1.0 |
| Diamine Starch[b] | 0.19 | 178.6 | 1.0 |
| Diamine Starch[b] | 0.20 | 167.9 | 1.0 |
| Diamine Potato Starch[c] | 0.20 | 167.9 | 1.0 |

[a]A tertiary monoamine starch derivative, prepared by reaction with 2-diethylaminoethyl chloride.
[b]Waxy maize starch reacted with 1,3-bis (dimethylamine)-2-chloropropane as in Example 1.
[c]Potato starch reacted with 1,3-bis (dimethylamine)-2-chloropropane as in Example 1.
[d]PROBOND is a trade name of AVEBE B. A., Veendam, Netherlands. It is a monoamine cationic potato starch.
[e]CORCAT P-600 is a trade name of Cordova Chemical Division of Hoechst-Celanese Corportion. The molecular weight of the polymer is about 60,000. Addition levels of 0.05 and 0.10% are typically used in industry.
[f]A phosphorylated (0.15% phosphorous) quaternary monoamine waxy maize starch derivative, prepared by reaction of starch with N-(3-chloro-2-hydroxypropyl) trimethylammonium chloride, followed by phosphorylation.

In another drainage test, carried out at higher shear rate (i.e., greater than 1000 rpm), the tertiary diamine starch derivatives at pH 8.0 in alum-free pulp performed at 137% of the level of a quaternary monoamine phosphate (0.15% phosphorus; 0.30% nitrogen) waxy maize starch control (amphoteric starch) at pH 5.5 in the presence of 3.3% alum. In all tests, the tertiary diamine starch derivatives of the invention were superior to controls.

D. Dynamic Alkaline Retention Evaluation of Diamine Starch Derivatives

The starch derivatives described in Tables II and III were prepared by the methods of Parts A and B, above. These derivatives were tested for dynamic alkaline CaCO$_3$ retention by the method set forth above, employing as controls a variety of cationic starches which are used commercially in the manufacture of paper.

Results that demonstrate superior retention performance at higher addition levels are set forth in Table II and III.

TABLE II

Pigment Retention

| Sample 0.5% Addition Level | Alum-Free Average % CaCO$_3$ Retention | % of Standard | With Alum[b] Average % CaCO$_3$ Retention | % of Standard |
|---|---|---|---|---|
| Monoamine Starch Contol[a] | 23.2 | 100.0 | 22.1 | 100.0 |
| Amphoteric Monoamine Starch[c] | 26.0 | 112.1 | 32.3 | 146.2 |
| Monoamine Potato Starch[d] | 34.6 | 149.1 | 41.3 | 186.9 |
| Amphoteric Monoamine Starch[f] | 35.0 | 150.9 | 38.6 | 174.7 |
| Diamine Waxy Maize Starch[e] | 33.9 | 146.1 | 34.3 | 155.2 |

[a]A tertiary monoamine starch derivative, prepared by reaction with 2-diethylaminoethyl chloride to yield 0.27% nitrogen.
[b]Pulp treated with 0.5% alum, just prior to addition of starch.
[c]Cast® 210
[d]PROBOND, a trade name for starch obtained from AVEBE B. A., Veendam, Netherlands.
[e]Waxy maize starch reacted with 1,3-bis (dimethylamino)-2-chloropropane to yield 0.28% nitrogen, starch dry weight basis, as in Example 1.
[f]A phosphorylated (0.15% phosphorous) quaternary monoamine waxy maize starch derivative prepared by reaction of starch with N-(3-chloro-2-hydroxy-propyl) trimethylammonium chloride, followed by phosphorylation.

TABLE III

Dynamic Pigment Retention

| Sample | Average % CaCO$_3$ Retention | % of Standard |
|---|---|---|
| 0.25% Addition Level | | |
| Amphoteric Monoamine Starch Control[b] | 19.3 | 100.0 |
| Monoamine Starch[a] | 19.3 | 100.0 |
| Monoamine Potato Starch[d] | 28.5 | 147.7 |
| Diamine Starch[e] | 20.4 | 105.7 |
| 0.50% Addition Level | | |
| Amphoteric Monoamine Starch Control[b] | 30.2 | 100.0 |
| Monoamine Starch[a] | 19.3 | 63.9 |
| Monoamine Potato Starch[d] | 35.4 | 117.2 |
| Diamine Starch[e] | 31.9 | 105.6 |
| 0.75% Addition Level | | |
| Amphoteric Monoamine Starch Control[b] | 36.2 | 100.0 |
| Monoamine Starch[a] | 21.0 | 58.0 |
| Monoamine Potato Starch[d] | 33.6 | 92.8 |
| Diamine Starch[e] | 42.0 | 116.0 |
| 1.00% Addition Level | | |
| Amphoteric Monoamine Starch Control[b] | 39.4 | 100.0 |
| Monoamine Starch[a] | 23.9 | 60.7 |
| Monoamine Potato Starch[d] | 33.1 | 84.0 |
| Diamine Starch[e] | 51.4 | 130.5 |
| 3.00% Addition Level[c] | | |
| Monoamine (Tertiary) Starch Control[a] | 20.8 | 100.0 |
| Monoamine Potato Starch[d] | 33.5 | 163.4 |
| Monoamine (Quaternary) Starch[f] | 27.2 | 132.7 |
| Diamine Starch[e] | 52.6 | 256.6 |

[a]A tertiary monoamine starch derivative prepared by reaction with 2-diethylaminoethyl chloride to yield 0.27% nitrogen.
[b]A phosphorylated (0.15% phosphorus) quaternary monoamine waxy maize starch derivative prepared by reaction of starch with N-(3-chloro-2-hydroxypropyl)trimethylammonium chloride, followed by phosphorylation.
[c]The 3% addition level experiment was run at a different time.
[d]PROBOND, a tradename for starch obtained from AVEBE B. A., Veendam, Netherlands.
[e]Waxy maize starch treated with 1,3-bis(dimethylamino)-2-chloropropane to yield 0.28% nitrogen, starch dry weight basis, as in Example 1.
[f]Waxy maize starch treated with N-(3-chloro-2-hydroxypropyl) trimethyl ammonium chloride, to yield 0.28% nitrogen, starch dry weight basis.

E. Paper Dry Strength Test of Tertiary Diamine Starch Derivative

A diamine waxy maize starch derivative, prepared as in Part B, above, was added to paper pulp (20 lbs. starch/ton pulp addition level) and evaluated in a pilot papermaking machine against an amphoteric starch derivative control (a phosphorylated quaternary monoamine phosphate (0.15% phosphorous) starch), prepared by reaction of starch with N-(3-chloro-2-hydroxypropyl)trimethyl-ammonium chloride, followed by phosphorylation. Paper with a weight basis of about 40–42 lbs/3,300 ft$^2$ was prepared from these starches, employing a 50/50 softwood/hardwood bleached kraft pulp and 20% precipitated CaCO$_3$ at a pH of 7.8 under alum-free conditions. Three paper strength tests were conducted (a Scott Bond Test; a Dry Tensile Strength Test; and a Mullen Test) and in each test the diamine starch derivative provided paper strength significantly greater than the control. See Table IV.

TABLE IV

| | Dry Strength Test | | |
|---|---|---|---|
| Starch | Scott Bond 2 ft lb/1,000 in$^2$ | Dry Tensile Strength lb/in | Mullen Test lb/in$^2$ |
| Amphoteric, quaternary Monoamine Control[a] | 69.2 | 3.9 | 8.1 |
| Diamine Waxy Maize Starch[b] | 161.2 | 9.5 | 20.8 |

[a]A commercially used amphoteric quaternary monoamine phosphate (0.15% phosphorous) starch derivative, prepared by reaction of starch with N-(3-chloro-2-hydroxypropyl) trimethylammonium chloride, followed by phosphorylation.
[b]Waxy maize starch treated with 1,3-bis(dimethylamino)-2-chloropropane to yield 0.28% nitrogen, starch dry weight basis, as in Example 1.

EXAMPLE 2

This example illustrates the preparation of a novel polycationic starch reactive reagent which contains both a tertiary amine and a quaternary amine, the derivatization of starch with this reagent, and the utility of this starch derivative in the manufacture of paper.

A. Preparation of 3-[(2-hydroxyethyl)ethylamino]-N,N,N-trimethyl-1-propanaminium iodide hydrochloride A total of 50.0 g of 3-(chloropropyl)trimethylammonium iodide was dissolved in 400 ml of absolute ethanol. The solution was brought to reflux and 17.0 g of 2-(ethylamino) ethanol in 35 ml of ethanol was added dropwise. The reaction solution was then refluxed for 18 hours. The reaction was cooled to room temperature and the ethanol was removed under vacuum. The desired amino alcohol was obtained in about 70% yield.

B. Preparation of 3-[(2-chloroethyl)ethylamino]-N,N,N-trimethyl-1-propanaminium iodide hydrochloride A total of 28 ml of thionyl chloride was added dropwise, with stirring, to 27.35 g of 3-[(2-hydroxyethyl)ethylamino]-N,N,N-trimethyl-1-propanaminium iodide hydrochloride in 200 ml of toluene at 50° C. Upon completion of the addition the mixture was stirred at 50° for 15 minutes, and then heated at 80° C. for 3 hours. The reaction mixture was steam distilled to remove toluene. Organic chloride analysis on the resulting aqueous solution showed the corresponding alkyl chloride was obtained in 88% yield.

C. Reaction of 3-[(2-chloroethyl)ethylamino]-N,N,N-trimethyl-1-propanaminium iodide hydrochloride with starch A total of 100 g of waxy maize starch was added to a solution of 125 ml of water and 30 g of sodium sulfate. The pH of the starch slurry was raised to 12.1 by the dropwise addition of 85 g of an aqueous solution containing 4.5% sodium hydroxide and 10% sodium sulfate. The starch slurry was heated to 45° C. and 58.5 g of an 8.54% aqueous solution of 3-[(2-chloroethyl)ethylamino]-N,N,N-trimethyl-1-propanaminium iodide hydrochloride was added. The reaction was allowed to proceed at 45° C. for 18 hours after which the starch slurry was cooled to room temperature and the pH was adjusted to 5.5 with 3:1 HCl. The starch product was filtered, washed, and air dried. The final starch product contained 0.28% nitrogen on a dry weight basis.

D. Drainage Performance of the Polycationic Starch Derivatives

The starch derivatives described in Table V were prepared by the methods of Parts A–C, above, and evaluated by the Britt Jar drainage performance test. Results are shown in Table V. Results show that as the starch derivative addition level is increased to 2% of the pulp, the drainage rate increases to 159.8% of the commercially used cationic starch control.

TABLE V

| Sample (pH = 8) | Drainage Performance | | | |
|---|---|---|---|---|
| | % Nitrogen (dry starch) | ml/sec (Average) | % of Standard | % Addition Level |
| Blank | — | 37.9 | 55.9 | — |
| Monoamine Starch Control[a] | 0.27 | 67.8 | 100.0 | 0.5 |
| Dicationic Waxy Maize Starch[b] | 0.28 | 46.2 | 68.1 | 0.5 |
| Blank | — | 37.9 | 54.5 | — |
| Monoamine Starch Control[a] | 0.27 | 69.6 | 100.0 | 1.0 |
| Dicationic Waxy Maize Starch[b] | 0.28 | 64.5 | 92.7 | 1.0 |
| Blank | — | 37.9 | 64.6 | — |
| Monoamine Starch Control[a] | 0.27 | 58.7 | 100.0 | 2.0 |
| Dicationic Waxy Maize Starch[b] | 0.28 | 93.8 | 159.8 | 2.0 |

[a]A tertiary monoamine starch derivative, prepared by reaction of starch with 2-diethyl-aminoethyl chloride. This derivative was used as the standard.
[b]Polycationic starch derivative prepared as in Example 2, above.

EXAMPLE 3

This example illustrates the preparation of a novel polycationic starch reactive reagent by dimerization or oligomerization of N-(3-[chloroacetamido]propyl)imidazole. This reagent contains one or more tertiary amines as well as tertiary and/or quaternary amines contained within one or more imidazole rings. It exemplifies the polycationic, starch reactive, heterocyclic reagents. This example also illustrates the derivatization of starch with this reagent, and the utility of this starch derivative in the manufacture of paper.

A. Preparation of oligomeric N-(3-[chloroacetamido]propyl)imidazole

A solution of 14.9 g of chloroacetyl chloride in 25 ml of methylene chloride was added to a stirred solution of 15.0 g of 1-(3-aminopropyl)imidazole in 75 ml of methylene chloride at 0° C. The rate of addition was controlled to keep the reaction temperature below 15° C. During the course of the reaction a brown gummy viscous oil separated out of solution. Approximately two-thirds of the way through the addition, 50 ml of 20% NaOH was added to the mixture, and the oil went into solution. After the addition was completed, the mixture was stirred at room temperature for 15 minutes. The water layer was removed, the organic layer was dried over $MgSO_4$ and filtered, and the solvent was removed under vacuum to give a yellow oil. The oil was dissolved in 30 ml of water and the pH was adjusted to approximately 3.0. Analysis for organic chloride indicated dimerization and/or trimerization had occurred.

B. Reaction of Oligomer with Starch

A total of 100 g of waxy maize starch was added to a solution of 125 ml of water and 30 g of sodium sulfate. The pH of the starch slurry was raised to 12.1 by the dropwise addition of 85 g of an aqueous solution containing 4.5% sodium hydroxide and 10% sodium sulfate. The starch slurry was heated to 45° C., and 25.3 g of a 17.1% aqueous solution (based on monomer) of oligomeric N-(3-[chloroacetamido]propyl)imidazole was added. The reaction was allowed to proceed at 45° C. for 18 hours after which the starch slurry was cooled to room temperature and the pH was adjusted to 5.5 with 3:1 HCl. After washing, the starch product contained 0.37% nitrogen on a dry weight basis.

C. Drainage Performance of the Polycationic Imidazole Starch Derivations

The starch derivatives described in Table VI were prepared by the methods of parts A and B, above, and evaluated by the Britt Jar drainage performance test. Results are shown in Table VI. Results show that as the starch addition level increases to 2% of pulp, the drainage rate increases to 180.4% of the commercially used cationic starch control.

TABLE VI

| Sample (pH = 8) | % Nitrogen[b] (dry starch) | ml/sec (Average) | % of Standard | % Addition Level |
|---|---|---|---|---|
| Blank | — | 41.1 | 60.3 | — |
| Monoamine Starch Control[a] | 0.27 | 68.2 | 100.0 | 0.5 |
| Imidazole Oligomer | 0.44 | 48.7 | 71.4 | 0.5 |
| Blank | — | 41.1 | 62.7 | — |
| Monoamine Starch Control[a] | 0.27 | 65.6 | 100.0 | 1.0 |
| Imidazole oligomer | 0.44 | 64.7 | 98.6 | 1.0 |
| Blank | — | 41.1 | 71.1 | — |
| Monoamine Starch Control[a] | 0.27 | 57.8 | 100.0 | 2.0 |
| Imidazole Oligomer | 0.44 | 104.3 | 180.4 | 2.0 |

[a]A tertiary monoamine starch derivative prepared by reaction of starch with 2-diethyl-aminoethyl chloride. This derivative was used as the standard.
[b]About one-third of the nitrogen content of the imidazole oligomer is not cationic. Thus cationic nitrogen content of all samples is approximately equal.

EXAMPLE 4

This example illustrates the preparation of a novel polycationic glucoside reagent, the preparation of a starch derivative from this reagent, and the utility of the starch derivative in paper-making.

A. Preparation of Allyl Glucoside

The procedure used herein is similar to that described by Otey, F. H.; Westhoff, R. P.; Mehltretter, C. L., in *Ind. Eng. Chem. Prod. Res. Develop.*, 11:70 (1972).

A total of 250 g glucose, 1 liter allyl alcohol, and 3 ml concentrated sulfuric acid were added to a 2-liter round-bottomed flask which was fitted with a reflux condenser, a mechanical stirrer, and a thermometer. The reaction mixture was heated to reflux with stirring. The progress of the reaction was monitored by thin layer chromatography on silica gel using a solvent mixture of 9 parts ethyl acetate, 4 parts isopropanol, and 2 parts water. After 1 hour at reflux temperature, no more glucose was observed, and the reaction was permitted to cool. The cooled solution was neutralized by the addition of 15 grams of barium carbonate, stirred for 15 minutes, and the precipitated barium sulfate was removed from the solution by vacuum filtration. The mixture was concentrated on a rotary evaporator. The remaining allyl alcohol was removed by dissolution of the residue in 500 ml of water and washing with ethyl acetate (3×500 ml). The aqueous solution was concentrated on a rotary evaporator, yielding 207 g of product.

B. Preparation of the Polycationic Allyl Glucoside

Allyl glucoside (50 g, prepared as in Part A) was dissolved in 100 ml water, and the pH of the solution was adjusted to 11.5 with 25% NaOH. A total of 260 g N-(3-chloro-2-hydroxypropyl)trimethylammonium chloride was added in 50 ml portions over 35 minutes while maintaining the pH at 11.5 with 25% NaOH, and the reaction continued for 4 hours. The pH was raised to 11.8 and maintained using a pH controller. The temperature was adjusted to 43° C. and the reaction was continued in a controlled temperature bath for 16 hours. The reaction was cooled and the pH was adjusted to 7. The reaction mixture was concentrated on a rotary evaporator and the mixture of yellow oil and white solids which remained was vacuum filtered through paper on a steam-heated porcelain funnel. A yellow oil (243 g) was recovered. NMR analysis of the oil showed a mixture of compounds with cationic substitution on several sites on the glucose ring.

C. Preparation of A Polycationic Epoxy Glucoside

A total of 5.0 g of polycationic allyl glucoside (prepared as in Part B) was dissolved in 85 ml of water. The pH was adjusted to 7, and 15 ml of 5% NaOCl solution (pH 7) was added. This solution was allowed to stand for 10 minutes at room temperature. Residual NaOCl was decomposed by addition of sufficient sodium bisulfite solution to yield a negative test on starch/KI paper.

D. Preparation of A Cationic Starch Derivative

A total of 50 g of waxy maize starch was added to a solution of 1.5 g NaOH and 10 g $Na_2SO_4$ in 75 ml water.

This starch slurry was combined with a polycationic epoxyglucoside solution (as prepared in Part C) in an 8-ounce jar, which was sealed and agitated for 16 hours at 42° C. The slurry was neutralized to pH 6.0 with 3-N hydrochloric acid and filtered. The filtered starch was washed with water (3×150 ml) and air-dried.

The treatment levels set forth in Table VII were employed in the starch reactions. The starch derivatives were analyzed for percent nitrogen and results are shown in Table VII. The results show that the level of nitrogen incorporation increases with increases in the level of treatment of the starch with the polycationic glucoside reagent.

TABLE VII

| Starch | Treatment Level | % Nitrogen |
|---|---|---|
| Waxy Maize | 5% | 0.11 |
| Waxy Maize | 10% | 0.20 |
| Waxy Maize | 20% | 0.37 |
| Waxy Maize | 30% | 0.53 |
| Waxy Maize | 50% | 0.74 |
| Potato | 50% | 1.06 |

E. Drainage Performance of Polycationic Glucoside Starch Derivatives

The starch derivatives described in Table VIII were prepared by the methods of Parts A–D, above, and tested for pulp drainage performance by the Britt Jar method. Results are set forth in Table VIII.

TABLE VIII

| Waxy Maize Starch Derivative | Pulp Addition Level (lb/ton) | Drainage Rate ml/sec | % of Standard |
|---|---|---|---|
| Cationic (0.33% N)[a] | 10 (0.5%) | 48.6 | 100.0 |
| Polycationic Glucoside[b] | 10 | 52.7 | 108.4 |
| Cationic (0.33% N)[a] | 20 (1.0%) | 51.0 | 100.0 |
| Polycationic Glucoside[b] | 20 | 84.5 | 165.7 |
| Cationic (0.33% N)[a] | 40 (2.0%) | 43.7 | 100.0 |
| Polycationic Glucoside[b] | 40 | 108.6 | 248.5 |

[a]Standard which is used in commercial paper production (a tertiary monoamine starch derivative, prepared by reaction with 2-diethylamino-ethyl chloride).
[b]Starch was treated with 20% (weight/weight) reagent and product had 0.37% nitrogen.

These results demonstrate that at all addition levels, superior, alkaline, alum-free drainage results can be obtained using starch additives which have been modified with polycationic glucosides.

F. Retention Performance of Polycationic Glucoside Starch Derivatives

The starch derivatives described in Table IX were prepared by the methods of Parts A–D, above, and tested for dynamic alkaline (CaCO$_3$) retention in paper pulp. Results are shown in Table IX.

TABLE IX

| Waxy Maize Starch Derivative | Addition Level (lb/ton) | Average % CaCO$_3$ Retained | % of Standard |
|---|---|---|---|
| Cationic (0.31% N) | 20 (1.0%) | 22.0 | 100.0 |
| Polycationic (0.37% N) | 20 | 19.6 | 89.1 |
| Cationic (0.31% N) | 40 (2.0%) | 25.9 | 100.0 |
| Polycationic (0.37% N) | 40 | 38.1 | 147.1 |
| Cationic (0.31% N) | 60 (3.0%) | 24.1 | 100.0 |
| Polycationic (0.37% N) | 60 | 69.3 | 287.6 |

[a]Standard which is used in commercial paper production (a tertiary monoamine starch derivative, prepared by reaction with 2-diethylaminoethyl chloride).
[b]Starch was treated with 20% (weight/weight) reagent and product had 0.37% nitrogen.

These results demonstrate that at higher addition levels, superior, alkaline, calcium carbonate retention results can be realized using polycationic glucoside starch derivatives.

EXAMPLE 5

This example illustrates the preparation of a series of polycationic, 4-substituted piperazine reagents, the preparation of starch derivatives from these reagents, and the utility of the starch derivatives in paper making.

A. Preparation of the 4-Substituted Piperazine Reagents

1. 1-(2-Chloroethyl)piperazine dihydrochloride

A mixture of 30.0 g (0.15 mol) of 1-(2-hydroxyethyl)piperazine dihydrochloride in 100 ml of thionyl chloride was refluxed under nitrogen for 24 hours. The mixture was cooled, filtered, and washed with methylene chloride to give 29.0 g (89%) of the hygroscopic dihydrochloride salt.

2. 4-Methyl-1-(2-chloroethyl)piperazine dihydrochloride

This reagent was prepared in two steps. The alcohol was prepared in the first step and the chloro-reagent was prepared from the alcohol in the second step.

a. 4-Methyl-1-(2-hydroxyethyl)piperazine dihydrochloride

A total of 100 g (0.77 mol) of 1-(2-hydroxyethyl)piperazine was added dropwise to a stirred solution of 78.6 g (1.54 mol) of 90% formic acid at 0° C. To the resulting solution, 63.2 g (0.77 mol) of 37% formaldehyde was added dropwise. The solution was stirred at 0° C. for 15 minutes and heated on a steam bath for 3 hours. The solution was acidified with 150 ml of concentrated hydrochloric acid. The water was removed and the resulting residue dissolved in 200 ml of 25% NaOH, and extracted with chloroform. The organic layer was dried over MgSO$_4$, filtered, and the solvent removed. The resulting residue was distilled to give 84.7 g (76%) (b.p. 96–97° C./3 Torr) of the alcohol as a colorless liquid. The dihydrochloride salt was prepared by acidifying the free base to a pH of 1 and removing the water.

b. 4-Methyl-1-(2-chloroethyl)piperazine dihydrochloride

A mixture of 20.0 g (0.092 mol) of 4-methyl-1-(2-hydroxyethyl)piperazine dihydrochloride in 60 ml of thionyl chloride was refluxed under nitrogen for 6 hours. The mixture was cooled, filtered, and washed with methylene chloride to give 20.8 g (96%) of the hygroscopic dihydrochloride salt.

3. 4,4-Dimethyl-1-(2-chloroethyl)piperazinium chloride hydrochloride

A solution of 10.0 g (0.042 mol) of tris(2-chloroethylamine)hydrochloride and 16 ml of (0.14 mol) of 40% aqueous dimethylamine in 70 ml of methanol was sealed in a pressure bottle and heated at 45° C. for 2 hours. The resulting reddish-brown solution was saturated with dry gaseous HCl. The solvents were removed to give a reddish-brown solid. The solid was recrystallized twice from ethanol to give 8.02 g (77%) of the salt as a colorless solid.

4. 4,4-Diethyl-1-(2-chloroethyl)piperazinium chloride hydrochloride

A solution of 16.7 g (0.069 mol) of tris(2-chloroethyl)amine hydrochloride and 17.2 g (0.230 mol) of diethylamine in 55 ml of methanol was heated at 45° C. for 2.5 hours. The methanolic solution was saturated with dry gaseous HCl. The methanol was removed to give a reddish-brown solid. The solid was recrystallized twice from isopropanol to give 12.0 g (62%) of the salt as a colorless solid.

5. 4-(2-diethylaminoethyl)-1-(2-chloroethyl)piperazine trihydrochloride

This reagent was prepared in two steps. The alcohol was prepared in the first step and the chloro-reagent was prepared from the alcohol in the second step.

a. 4-(2-Diethylaminoethyl)-1-(2-hydroxyethyl)piperazine trihydrochloride

To a stirred solution of 76.0 g (0.58 mol) of 1-(2-hydroxyethyl)piperazine in 200 ml of water was added dropwise 201.0 g (0.58 mol) of a 50% aqueous solution of 2-(diethylamino)ethyl chloride hydrochloride. The pH was maintained at 10 by addition of 25% NaOH while the solution was stirred for 18 hours. Water was removed to give a thick oil which was extracted with ethanol. The ethanolic solution was filtered, then the ethanol was removed. The resulting liquid was distilled to give 67.7 g (51%) (b.p. 110–112° C./0.1 Torr) of the alcohol as a light brown liquid. The trihydrochloride salt was prepared by acidifying the free base to a pH of 1 and removing the water.

b. 4-(2-Diethylaminoethyl)-1-(2-chloroethyl)piperazine trihydrochloride

A mixture of 15.0 g (0.044 mol) of 4-(2-diethylaminoethyl)-1-(2-hydroxyethyl)piperazine trihydrochloride in 80 ml of thionyl chloride was refluxed under nitrogen for 3 hours. The mixture was cooled, filtered, and washed with methylene chloride to give 10.9 g (69%) of the hygroscopic trihydrochloride salt.

B. Preparation of a Cationic Starch Derivative

A slurry of starch (100 g), sodium sulfate (30 g), water (135 ml) and sodium hydroxide (3 g) was prepared, the temperature was adjusted to 45° C., and an appropriate amount of the 4-substituted piperazine reagent was added to the slurry. The pH was maintained at 11.5 by addition of a 4.5% aqueous solution of sodium hydroxide containing 10% sodium sulfate. The slurry was stirred for 16 hours, and cooled to room temperature. The pH of the slurry was adjusted to 5.5 by addition of 3:1 HCl. The slurry was filtered and the filter cake washed with water.

The nitrogen content of the derivatives on a dry starch weight basis is listed in Table X, below.

C. Drainage Performance of the Cationic Starch Derivative

The 4-substituted piperazine starch derivatives described in Table X were prepared by the methods of Parts A and B, above, and evaluated by the Britt Jar drainage performance test. Results are shown in Table X. The results show that the polycationic starch derivative provides superior drainage performance at all addition levels compared to a commercially used cationic starch control.

TABLE X

Drainage Performance[c]

| Starch Derivative: 4-Substituted Piperazine Reagent Employed[a] | % nitrogen | % of Standard % addition Level[d] | | |
|---|---|---|---|---|
| | | 0.5% | 1.0% | 2.0% |
| 1 | 0.35 | 103 | 117 | 131 |
| 2 | 0.51 | 96 | 102 | 117 |
| 3 | 0.43 | 122 | 128 | 165 |
| 4 | 0.42 | 117 | 142 | 160 |
| 5 | 0.51 | 120 | 151 | 232 |
| Control[b] | 0.28 | 100 | 100 | 100 |

[a]See Example 5, Parts A and B, for preparation of reagents and starch derivatives.
[b]A tertiary monoamine starch derivative, prepared by reaction of starch with 2-diethyl-aminoethyl chloride, was employed as the standard.
[c]Tests were conducted at pH 8.0 in the absence of alum.
[d]Percentage of starch derivative on a pulp dry weight basis.

EXAMPLE 6

This example illustrates the preparation of a cationic cellulose derivative employing the polycationic reagent, 1,3-bis(dimethylamino)-2-chloropropane, of Example 1.

The polycationic reagent (8.1 g) was dissolved in water (10.2 g) and placed in an addition funnel. The reagent solution was added slowly over one-half hour at room temperature to a 4-neck flask containing 150 g Isopar® E (a registered trademark for a hydrocarbon obtained from Exxon Chemical Company), 7.5 g Span® 80 (a registered trademark for a surfactant obtained from ICI Americas, Inc., Wilmington, Del.) and 20 g Natrosol® (a registered trademark for a hydroxyethyl cellulose obtained from Hercules Chemical). The mixture was heated, with agitation, to 50° C. and a total of 20.2 g of a 25% NaOH solution was added, with agitation, in 2 ml increments every 5–10 minutes. The mixture was held at 50° C. for 5 hours, water was removed under reduced pressure and the mixture was cooled to room temperature. Glacial acetic acid was slowly added to the mixture, with agitation, over a one-half hour period to adjust the pH to 6.0, and agitation was continued for one-half hour. The product was twice filtered, suspended in isopropanol and stirred for one hour, and then filtered to yield a cellulose derivative containing 0.684% nitrogen. After dialysis, the cellulose derivative contained 0.51% nitrogen.

EXAMPLE 7

This example illustrates the preparation of a cationic guar gum derivative employing the polycationic reagent, 1,3-bis(dimethylamine)-2-chloropropane, of Example 1.

A slurry is prepared from 60 parts of guar gum in 360 parts of 50% aqueous isopropanol. The slurry is heated to 40° C. and nitrogen gas is bubbled into the slurry for 1 hour. A total of 7.2 parts of 50% aqueous sodium hydroxide is added, the slurry is stirred for about 10 min., and 4.8 parts of 50% aqueous 1,3-bis(dimethylamino)-2-chloroproane are added. The slurry is stirred for 4 hr. at 40° C. The pH is lowered to 8.2 with dilute acetic acid, and the derivative is recovered by filtration, washed with aqueous isopropanol followed by 100% isopropanol, and air-dried.

Now that the preferred embodiments of the present invention have been described in detail, various modifications and improvements thereon will become readily apparent to those skilled in the art. Accordingly, the scope and spirit of the invention are to be limited only by the claims and not by the foregoing specification.

EXAMPLE 8

This example illustrates the preparation of quaternary-quaternary diamine reagents, the preparation of starch derivatives from these reagents, and the utility of the starch derivatives in paper making.

A. Preparation of quaternary-quaternary Diamine Reagents 1. 3-Bromo-2-hydroxypropyl 2-(trimethylammonio chloride)ethyl dimethylammonium phthalate A solution of 75.0 g (0.52 mol) of 2-dimethylaminoethyl chloride hydrochloride in 150 ml of water was added dropwise to a stirred solution of 250 ml of 25% trimethylamine (62.5 g; 1.06 mol). The pH was maintained at 12 by the addition of 25% NaOH with stirring for 16 hours. The pH was raised to 13, the water was removed, the resulting oil was extracted with methanol and filtered, and the methanol was removed to yield the diamine (2-(trimethylammonio chloride)ethyl dimethylamine).

A solution of 20.0 g of the diamine (0.12 mol) and 14.5 g of allyl bromide (0.12 mol) in 50 ml of ethanol was refluxed for 18 hours, and roto-evaporated to yield a brown solid which was placed under vaccum (0.1 Torr) at room temperature for 24 hours. The product of this reaction (2-(trimethylammonio chloride) ethyl allyl dimethylammonium bromide) (10.0 g; 0.035 mol) was dissolved in 50 ml water. A total of 10.8 g (0.018 mol) of 80% magnesium monoperoxyphthalte in 45 ml of water was added to the allyl diamine and stirred until a clear colorless solution was obtained. The solution was concentrated to about 20 ml.

The product was identified as 3-Bromo-2-hydroxypropyl 2-(trimethylammonio chloride)ethyl dimethylammonium phthalate by NMR analysis.

2. 1-Glycidyl-1,4,4-trimethylpiperazinium dichloride 2-([2-(dimethylamino)ethyl]methylamino)ethanol dihydrochloride was prepared by acidifying the free base to a pH of 1 and removing the water. A mixture of 100.0 g (0.46 mol) of 2-([2-(dimethylamino)ethyl]methylamino)ethanol dihydrochloride in 350 ml of thionyl chloride was refluxed for 3 hours under a blanket of nitrogen. The mixture was cooled, filtered, and washed with methylene chloride to give the hygroscopic dihydrochloride salt, 2-([2-(dimethylamino) ethyl]methylamino)ethyl chloride dihydrochloride.

A solution of 67.0 g (0.28 mol) of this salt in 150 ml of water was added dropwise to 100 mls of a 77.3% solution of potassium carbonate (0.56 mol). The solution was stirred for 18 hours, water was removed, and the residue was extracted twice with 100 ml of hot ethanol. Ethanol was removed and the crude product was recrystallized from ethyl acetate/ethanol to give 19.9 g (46%) of the colorless salt (1,1,4-trimethylpiperazinium dichloride).

A solution of 11.5 g (0.070 mol) of 1,1,4-trimethylpiperazinium chloride and 6.46 g (0.070 mol) of epichlorohydrin in 50 ml of ethanol was allowed to stir for 11 days. The product which had precipitated, was filtered, and washed with methylene chloride to give 7.9 g (44%) of the colorless salt (1-Glycidyl-1,4,4-trimethylpiperazinium dichloride).

B. Preparation of the Quaternary Diamine Starch Derivatives

1. Reaction of 1-Glycidyl-1,4,4-trimethylpiperazinium dichloride with starch A total of 100 g of waxy maize starch was added to 150 ml of water which also contained 30 g of sodium sulfate and 1.5 g of sodium hydroxide. The starch slurry was heated to 45° C. and 5 g of 1-glycidyl-1,4,4-trimethylpiperazinium dichloride was added to the slurry. The pH was maintained at 11.5 by addition of a 4.5% aqueous sodium hydroxide solution containing 10% sodium sulfate. The slurry was stirred for 18 hours, and cooled to room temperature. The pH of the slurry was adjusted to 5.5 by addition of 3:1 HCl. The slurry was filtered and the filter cake washed three times with 150 ml of water. The final starch product contained 0.29% nitrogen (dry basis).

2. Reaction of 3-Bromo-2-hydroxypropyl 2-(trimethylammonio chloride)ethyl dimethylammonium phthalate with starch A total of 50 g of waxy maize starch was added to 75 ml of water which also contained 15 g of sodium sulfate and 1 g of sodium hydroxide. The starch slurry was heated to 45° C. and the concentrated solution described In Part A.1., above was added to the slurry. The pH was mainted at 11.5 by addiditon of a 4.5% aqueous sodium hydroxide solution containing 10% sodium sulfate. The slurry was stirred for 18 hours, and cooled to room temperature. The pH of the slurry was adjusted to 5.5 by addition of 3:1 HCl. The slurry was filtered and the filter cake washed three times with 75 ml of water. The final starch product contained 0.28% nitrogen (dry basis).

C. Drainage Performance of Quaternary Diamine Starch Derivatives

A starch derivative prepared by the method of Part B, above, was tested for pulp drainage performance at pH 8.0 by the Britt Jar method. Results are shown in Table XI.

TABLE XI

| | Drainage Performance | | |
|---|---|---|---|
| Sample | % Nitrogen (dry starch) | Drainage % of Standard | % Addition Level |
| Monoamine Starch Control[a] | 0.27 | 100.0 | 0.5 |
| Diamine Starch[b] | 0.30 | 81.4 | 0.5 |
| Diamine Starch[c] | 0.29 | 87.0 | 0.5 |
| Monoamine Starch Control[a] | 0.27 | 100.0 | 1.0 |

TABLE XI-continued

| | Drainage Performance | | |
|---|---|---|---|
| Sample | % Nitrogen (dry starch) | Drainage % of Standard | % Addition Level |
| Diamine Starch[b] | 0.30 | 123.2 | 1.0 |
| Diamine Starch[c] | 0.29 | 124.0 | 1.0 |
| Monoamine Starch Control[a] | 0.27 | 100.0 | 2.0 |
| Diamine Starch[b] | 0.30 | 212.0 | 2.0 |
| Diamine Starch[c] | 0.29 | 209.8 | 2.0 |

[a]A tertiary monoamine starch derivative, prepared by reaction with 2-diethylaminoethyl chloride.
[b]Waxy maize starch reacted with 1,3-bis (dimethylamine)-2-chloropropane as in Example 1.
[c]Waxy maize starch reacted with 1-Glycidyl-1,4,4-trimethylpiperazinium dichloride as in Example 8, Part B, above.

These results demonstrate that compared to a commercially used cationic starch, superior alum-free drainage can be obtained with quaternary diamine starch derivatives at addition levels of 1.0% and above.

Now that the preferred embodiments of the present invention have been described in detail, various modifications and improvements thereon will become readily apparent to those skilled in the art. Accordingly, the scope and spirit of the invention are to be limited only by the claims and not by the foregoing specification

We claim:

1. A paper containing homogeneously dispersed therein a cationic polysaccharide derivative having at least two cationic moieties bonded to each derivatized saccharide monomer, said derivative having been prepared by reaching a substantially non-crosslinked polycationic reagent having a single polysaccharide reactive group and at least two cationic groups, whereby the derivative is water dispersible, wherein the polycationic reagent is a polyamine having the structure:

wherein $R^1$, $R^3$, $R^4$ and $R^5$ are identical or different and represent a $C_1$–$C_6$ alkyl group or a $C_6$ aryl group or a $C_6$–$C_{12}$ alkaryl group; $R^2$ are a $C_2$–$C_6$ alkylene or alkylene ether or a $C_6$ arylene or a $C_6$–$C_{12}$ alkarylene group; $R^6$, $R^7$, $R^8$ and $R^9$ is independently, hydrogen or a $C_1$–$C_6$ alkyl or a $C_6$–$C_{12}$ alkaryl group; Z is a polysaccharide reactive group; and A is an anion.

2. A paper containing homogeneously dispersed therein a cationic polysaccharide derivative having at least two cationic moieties bonded to each derivatized saccharide monomer, said derivative having been prepared by reacting a substantially non-crosslinked polycationic reagent having a single polysaccharide reactive group and at least two cationic groups, whereby the derivative is water dispersible, wherein the polycationic reagent has the structure:

wherein $R^1$, $R^3$ and $R^4$ are identical or different and represent a $C_1$–$C_6$ alkyl group or a $C_6$ aryl group or a $C_6$–$C_{12}$ alkaryl group; $R^2$ are a $C_2$–$C_6$ alkylene or alkylene ether or a $C_6$ arylene or a $C_6$–$C_{12}$ alkarylene group; $R^5$, $R^6$, $R^7$ and $R^8$ is, independently, hydrogen or a $C_1$–$C_6$ alkyl or a $C_6$ aryl or a $C_6$–$C_{12}$ alkaryl group; Z is a polysaccharide reactive group; n is an integer from 1 to about 10; and A is an anion.

3. A paper containing homogeneously dispersed therein a cationic polysaccharide derivative having at least two cationic moieties bonded to each derivatized saccharide monomer, said derivative having been prepared by reacting a substantially non-crosslinked polycationic reagent having a single polysaccharide reactive group and at least two cationic groups, whereby the derivative is water dispersible, wherein the polycationic reagent is a 4-substituted piperazine having the structure:

wherein A is an anion; Z is a polysaccharide reactive group; R, $R^1$, $R^2$, $R^3$, $R^4$ and $R^5$ may be, independently, hydrogen or a $C_1$–$C_6$ group or a $C_6$ aryl or a $C_6$–$C_{12}$ alkaryl group, or dialkylamino alkyl or a bis (dialkylamino) alkyl group, wherein each alkyl substituent contains from 1 to 6 carbon atoms.

4. A paper containing homogeneously dispersed therein a cationic polysaccharide derivative having at least two cationic moieties bonded to each derivatized saccharide monomer, said derivative having been prepared by reacting a substantially non-crosslinked polycationic reagent having a single polysaccharide reactive group and at least two cationic groups, whereby the derivative is water dispersible, wherein the polycationic reagent is selected from the group consisting of 1-(2-chloroethyl)piperazine dihydrochloride; 4-methyl-1-(2-chloroethyl)piperazine dihydrochloride; 4,4-diethyl-1-(2-chloroethyl)piperazinium chloride hydrochloride; 4,4-diethyl-1-(2-chloroethyl)piperazinium chloride hydrochloride, and 4-(2-diethylaminoethyl)-1-(2-chloroethyl)piperazine trihydrochloride.

5. A paper containing homogeneously dispersed therein a cationic polysaccharide derivative having at least two cationic moieties bonded to each derivatized saccharide monomer, said derivative having been prepared by reacting a substantially non-crosslinked polycationic reagent having a single polysaccharide reactive group and at least two cationic groups, whereby the derivative is water dispersible, wherein the polycationic reagent has the structure:

wherein $R^1$, $R^2$, $R^3$ and $R^4$ are identical or different and represent hydrogen or $C_1$–$C_6$ alkyl group or a $C_6$ aryl or a $C_6$–$C_{12}$ alkaryl group; $R^5$, $R^6$, $R^7$ and $R^8$ are identical or different and represent a $C_1$–$C_6$ alkyl group or a $C_6$ aryl or a $C_6$–$C_{12}$ alkaryl group, or a cyclic structure having a $C_2$–$C_6$ alkylene or $C_6$ arylene or $C_6$–$C_{12}$ alkarylene group or a heterocyclic structure having O, S or P atoms, or NR moieties, wherein R is a $C_1$–$C_4$ alkyl group; Z is a polysaccharide reactive group; and n and m are, independently, integers from 1 to about 6, except that either n or m must be 1.

6. A paper containing homogeneously dispersed therein a cationic polysaccharide derivative having at least two cationic moieties bonded to each derivatized saccharide monomer, said derivative having been prepared by reacting a substantially non-crosslinked polycationic reagent having a single polysaccharide reactive group and at least two cationic groups, whereby the derivative is water dispersible, wherein the polycationic reagent has the structure:

wherein $R^1$ and $R^2$ are identical or different and represent a $C_1$–$C_6$ alkyl group or a $C_6$ aryl or a $C_6$–$C_{12}$ alkaryl group, or a cyclic structure have a $C_2$–$C_6$ alkylene or a $C_6$ arylene or a $C_6$–$C_{12}$ alkarylene group or a heterocyclic structure having O, S or P atoms, or NR moieties, wherein R is a $C_1$–$C_4$ alkyl group; $R^3$, $R^4$, $R^5$, $R^6$ and $R^7$ are identical or different and represent hydrogen or a $C_1$–$C_6$ alkyl group or a $C_6$ aryl or a $C_6$–$C_{12}$ alkaryl group, or a tertiary amino- or a quaternary amino-alkyl, aryl or alkaryl group, containing $C_1$–$C_6$ alkyl or $C_6$ aryl or $C_6$–$C_{12}$ alkaryl substituents; n is an integer from 0 to about 6; Z is a polysaccharide reactive group; Q is hydrogen or:

wherein $R^{11}$ and $R^{12}$ are identical or different and represent hydrogen or a $C_1$–$C_6$ alkyl group or a $C_6$ aryl group or a $C_6$–$C_{12}$ alkaryl group; m is an integer from 0 to about 6; and $R^8$, $R^9$ and $R^{10}$ are identical or different and represent a $C_1$–$C_6$ alkyl group or a $C_6$ aryl group or a $C_6$–$C_{12}$ alkaryl group, or a cyclic structure having a $C_2$–$C_6$ alkylene or a $C_6$ arylene or a $C_6$–$C_{12}$ alkarylene group, or a heterocyclic structure having O, S or P atoms, or NR moieties, wherein R is a $C_1$–$C_4$ alkyl group, or either $R^8$, $R^9$ or $R^{10}$ is hydrogen provided that only one is hydrogen; except that when Q is hydrogen, either $R^5$, $R^6$ or $R^7$ (or $R^3$ or $R^4$, if n is not equal to zero), must be a tertiary amino- or a quaternary amino-alkyl, aryl, or alkaryl group, containing $C_1$–$C_6$ alkyl, $C_6$ aryl or $C_6$–$C_{12}$ alkaryl substituents.

7. A paper containing homogeneously dispersed therein a cationic polysaccharide derivative having at least two cationic moieties bonded to each derivatized saccharide monomer, said derivative having been prepared by reacting a substantially non-crosslinked polycationic reagent having a single polysaccharide reactive group and at least two cationic groups, whereby the derivative is water dispersible, wherein the polycationic reagent is a polyamine having the structure:

wherein R, $R^1$, $R^2$, $R^4$ and $R^5$ are identical or different and represent a $C_1$–$C_6$ alkyl group or a $C_6$ aryl group or a $C_6$–$C_{12}$ alkaryl group, or a cyclic structure having a $C_2$–$C_6$ alkylene or $C_6$ arylene or $C_6$–$C_{12}$ alkarylene group or a heterocyclic structure have O, S or P atoms, or $NR^6$ moieties, wherein $R^6$ is a $C_1$–$C_4$ alkyl group, except that $R^2$ and $R^4$ cannot be 2-(trialkylammonio halide) ethylene groups; $R^3$ is a $C_2$–$C_6$ alkylene or alkylene ether or a $C_6$ arylene or a $C_6$–$C_{12}$ alkarylene group; A is an anion; Z is a polysaccharide-reactive group; and n is an integer from 1 to about 10.

* * * * *